No. 692,993. Patented Feb. 11, 1902.
C. DIETZ.
MECHANICAL MOVEMENT.
(Application filed Dec. 22, 1900.)
(No Model.) 2 Sheets—Sheet 2.
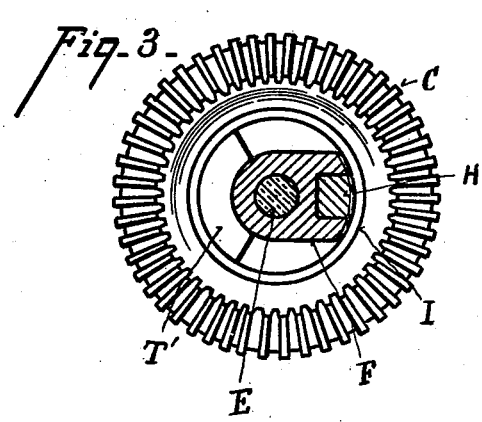
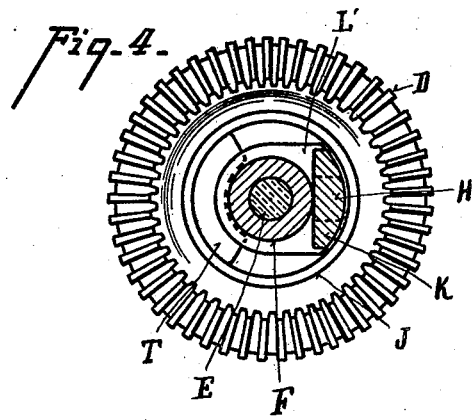
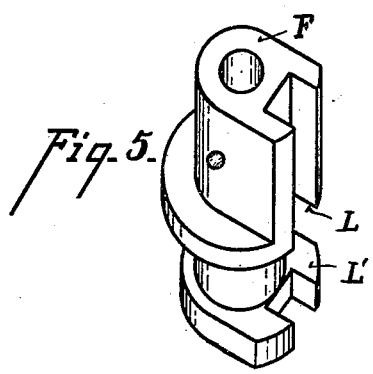
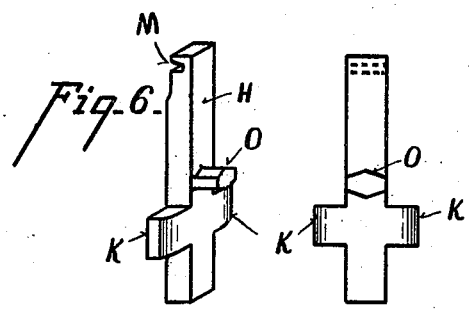
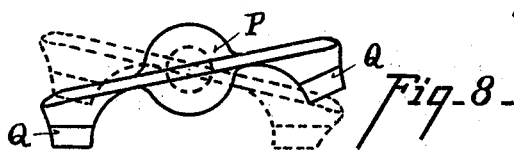
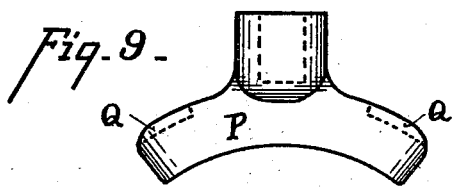
Witnesses
Richard Phillips
A H Neville
Inventor
Conrad Dietz
By James A. Ramsey Attorney

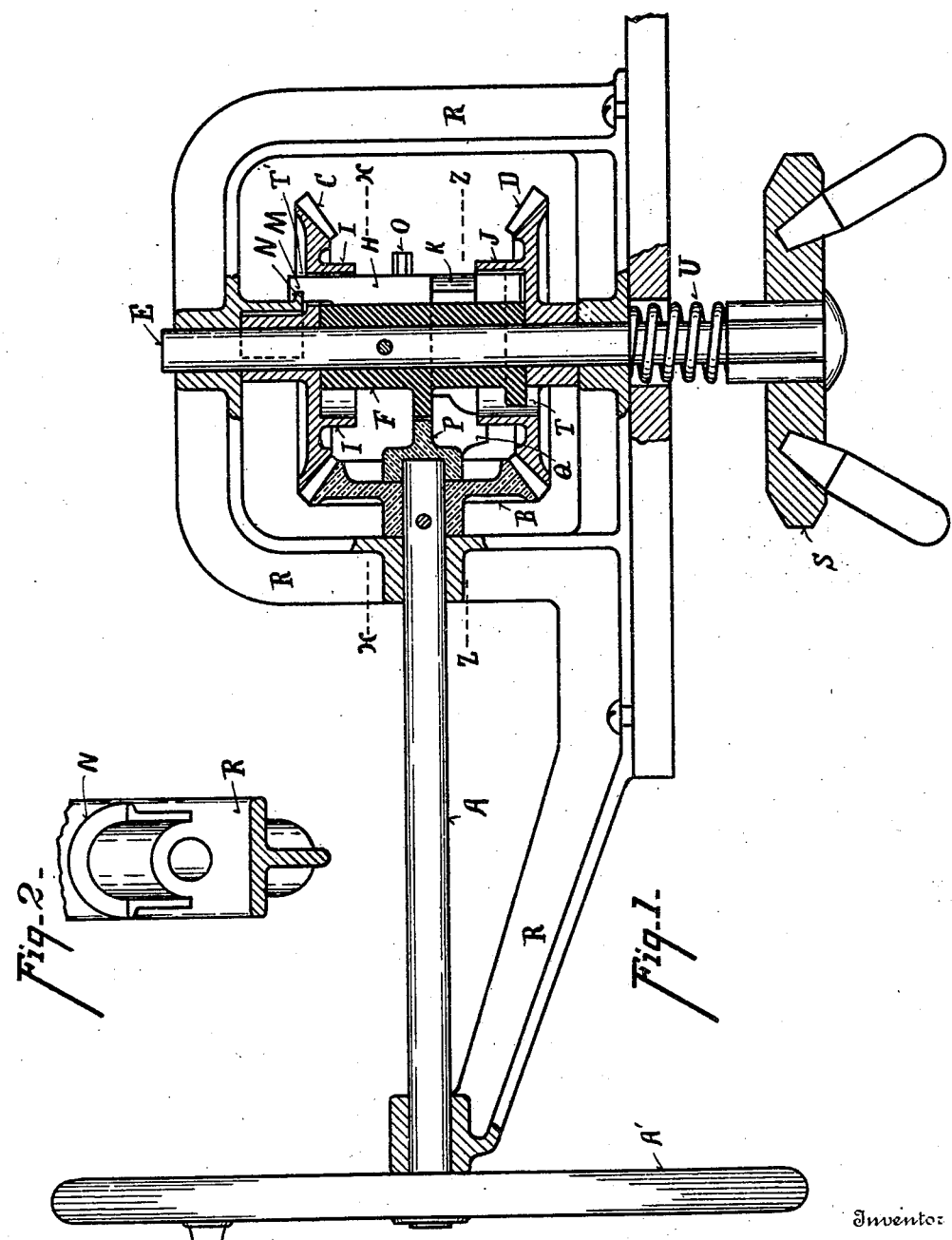

UNITED STATES PATENT OFFICE.

CONRAD DIETZ, OF CINCINNATI, OHIO.

MECHANICAL MOVEMENT.

SPECIFICATION forming part of Letters Patent No. 692,993, dated February 11, 1902.

Application filed December 22, 1900. Serial No. 40,765. (No model.)

*To all whom it may concern:*

Be it known that I, CONRAD DIETZ, a citizen of the United States, residing at Cincinnati, in the county of Hamilton and State of Ohio, have invented certain new and useful Improvements in Mechanical Movements, of which the following is a specification.

My invention relates to improvements in mechanical movements.

Its object is to provide a strong, reliable, and inexpensive movement for periodically reversing the direction of rotation of the operative spindle while the driving-spindle is continuously driven in one direction.

My invention consists in certain novel features of the construction, combination, and arrangement of the several parts of my improved device.

The novel features will be defined in the claims.

In the accompanying drawings, which serve to illustrate my invention, Figure 1 is a side elevation of my improved movement, partly in section, adapted, as shown, to be applied to a washing-machine. Fig. 2 is a perspective view of a part of the yoke-frame. Fig. 3 is a section on line $xx$ of Fig. 1, showing the upper gear in under side plan view. Fig. 4 is a section on line $zz$ of Fig. 1, showing the lower gear in plan view. Fig. 5 is a perspective view of the key-seated sleeve. Fig. 6 is a perspective view of the key. Fig. 7 is a side elevation of the same. Fig. 8 is an end view of the key-tilting arm. Fig. 9 is a top plan view of the same.

A represents the driving-shaft, which, as shown in Fig. 1, is driven by means of the hand-wheel A'. It may, however, be driven by a belt-pulley or in any other approved manner.

B represents a beveled driving-gear pinned to the driving-shaft and engaging and driving two beveled gears C D, which are each loosely journaled upon a spindle E, the movement of which is reversed at regular intervals.

F represents a sleeve which is keyed or pinned to the spindle E intermediate the gears C D and serves to hold these gears the requisite distance apart. The sleeve F is provided with a key-seat in which is seated the key H, the length of the key being such that it can only engage one of the gears C D at one time. The key is held in place in the key-seat by means of annular flanges I J, preferably formed integral with the gears C D, and the upward and downward or endwise movements of the key are limited by the engagement of the cross-arms K of the key with the faces L L' of the sleeve F. The upper end of the key is provided with a groove M, which engages a semi-annular rib N, preferably formed integral with the frame-casting.

O represents a shifting-lug preferably formed integral with the key for shifting the position thereof.

P represents a tilting arm which is preferably supported or loosely journaled upon the inner end of the driving-shaft in such a manner as to prevent its displacement during the operation of the mechanism. One or other of the wings Q of the tilting arm normally rests upon the edge of the flange J, as indicated in Figs. 1 and 8, depending upon the direction in which the driving-shaft is being turned, and upon reversing the direction of the driving-shaft the tilting arm becomes tilted in the opposite direction through its frictional engagement with the driving-shaft. The driving-shaft may be turned in either direction, as desired.

The mode of operation is as follows: The driving-shaft is started and turns the gear B, and through it the gears C D, which turn in opposite directions. The tilting arm is also tilted by the movement of the driving-shaft. The key H is always in engagement with or ready to engage one of the gears C D, and thereby turn the spindle E with the gear so engaged. Suppose the key to be in engagement with the slot T in the gear D, which it will do by gravity whenever it is not held or lifted out of engagement therewith. The turning of the driving-gear then drives the spindle in one direction through the gear D until the shifting-lug O comes around to engage the tilting arm P, which forms an incline to lift the key out of engagement with the gear D and causes the upper end of the key to pass through the slot T' in the gear C, which being driven in the opposite direction reverses the motion of the spindle until such time as the tilting arm or gravity causes the key to drop onto the upper face of the gear D and then into the slot T, when the slot comes under the lower end of the key to again reverse the motion of the driven spindle. In order to hold the key in engagement with the gear C the desired length of time, the semi-annular rib N engages the notch M in the upper end of the key immediately after the key has been shifted to the elevated position, and this rib does not disengage the key until the parts are in a position ready to reverse the position of the key. The cross-arm K serves to limit the vertical movement of the key in both directions.

U represents a spring which is preferably employed and serves to take up the lost motion between the parts and to check the acquired momentum of the parts and relieve them from any vibration at the instant of reversing the motion.

I have shown my movement adapted to be applied to a washing-machine in which S represents the agitator employed to move the clothes about in the tub alternately in opposite directions. It may, however, be applied to any similar use.

R represents the frame in which the operating parts are mounted.

My invention is capable of some modification without material departure from the scope thereof, and I do not, therefore, wish to be understood as limiting myself to the precise form and arrangement of the various parts.

Having described my invention, what I claim is—

1. A mechanical movement consisting of a driving-shaft, a gear mounted thereon, a driven spindle, two gears mounted loosely thereon, and each driven by the gear on the driving-shaft; a key sliding endwise along said spindle, and a tilting arm adapted to engage the key and automatically shift it to alternately engage the respective gears on the spindle.

2. A mechanical movement consisting of a driving-shaft, a gear mounted thereon, a driven spindle, two gears loosely mounted thereon, a sleeve rigidly mounted upon the spindle between said gears, a key seated in a groove in said sleeve, and a tilting arm adapted to engage said key and automatically shift it endwise to alternately engage the gears upon the spindle, substantially as specified.

3. A mechanical movement consisting of a driving-shaft, a gear mounted thereon, a driven spindle, two gears loosely mounted thereon, each of said gears being provided with a recess to engage an end of the key, and a laterally-projecting annular flange upon its inner face, a sleeve rigidly mounted upon the spindle between the gears, a key seated in a groove in the face of said sleeve and provided with cross-arms to limit its endwise movement, a shifting-lug on said key, and a tilting arm loosely mounted and carried on the end of the driving-shaft, and also having wings for automatically shifting the key endwise to alternately engage the gears upon the spindle.

4. A mechanical movement consisting of a driving-shaft, a gear mounted thereon, a driven spindle, two gears loosely mounted thereon, each provided with an aperture adapted to engage the end of the key, a sleeve mounted rigidly upon the spindle, a key mounted in a groove in the face of said sleeve, a semi-annular stationary rib adapted to engage the key and lock the key in the adjusted position during a prescribed portion of its movement, and a tilting arm adapted to automatically shift the key endwise to alternately engage the opposite gears on the spindle.

5. In a mechanical movement, a driving-shaft, a gear mounted thereon, a driven spindle, two gears loosely mounted thereon, a tilting arm having wings, a sleeve having a flange adapted to engage and hold said tilting arm in place, a key adapted to be shifted endwise along the driven spindle to alternately engage the respective gears thereon, and a tilting arm adapted to engage and shift said key.

6. A mechanical movement consisting of a driving-shaft, a gear mounted thereon, a driven spindle, two gears loosely mounted thereon, each of said gears being provided with a recess to engage the end of the key and a laterally-projecting annular flange upon its inner face, a sleeve rigidly mounted upon the spindle, a key, and means for shifting and holding the same.

7. A mechanical movement consisting of a driven shaft, a gear mounted thereon, a driven spindle, two gears loosely mounted thereon, each of said gears being provided with a recess to engage the end of the key, a sleeve rigidly mounted upon the spindle, a key seated in a groove in the face of said sleeve and provided with cross-arms adapted to move therewith and to limit its movement endwise, a shifting-lug on said key, and means for endwise adjustment of said key.

CONRAD DIETZ.

Witnesses:
JOHN DIETZ,
JAMES N. RAMSEY.